US008132151B2

(12) United States Patent
Ahern et al.

(10) Patent No.: US 8,132,151 B2
(45) Date of Patent: Mar. 6, 2012

(54) ACTION TAGS

(75) Inventors: Shane P. Ahern, Foster City, CA (US); Alexander B. Jaffe, Beverly Hills, CA (US); Simon P. King, Berkeley, CA (US); Mor Naaman, San Francisco, CA (US); Rahul Nair, Oakland, CA (US); Jeannie Hui-I Yang, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1266 days.

(21) Appl. No.: 11/489,738

(22) Filed: Jul. 18, 2006

(65) Prior Publication Data

US 2008/0021876 A1 Jan. 24, 2008

(51) Int. Cl.
*G06F 9/44* (2006.01)
*G06F 9/45* (2006.01)
*G06F 17/00* (2006.01)
*G06F 3/00* (2006.01)
*G06F 3/048* (2006.01)

(52) U.S. Cl. ........ 717/115; 717/106; 717/128; 717/143; 715/205; 715/716; 715/764

(58) Field of Classification Search ........................ None
See application file for complete search history.

(56) References Cited

U.S. PATENT DOCUMENTS

| 6,337,696 | B1 * | 1/2002 | Lindhorst et al. ............. 717/115 |
| 7,278,132 | B2 * | 10/2007 | Pelegri-Llopart et al. .... 717/115 |
| 7,546,576 | B2 * | 6/2009 | Egli ............................. 717/106 |
| 7,603,352 | B1 * | 10/2009 | Vassallo et al. ...................... 1/1 |
| 2002/0026447 | A1 * | 2/2002 | Matsutsuka et al. ....... 707/103 Y |
| 2002/0165954 | A1 * | 11/2002 | Eshghi et al. ................ 709/224 |
| 2003/0021441 | A1 * | 1/2003 | Levy et al. ..................... 382/100 |
| 2004/0126038 | A1 * | 7/2004 | Aublant et al. ............... 382/305 |
| 2004/0163045 | A1 * | 8/2004 | Hui et al. ...................... 715/513 |
| 2004/0220893 | A1 * | 11/2004 | Spivack et al. ................ 717/143 |
| 2008/0005652 | A1 * | 1/2008 | Krishnaswamy et al. . 715/500.1 |
| 2008/0082904 | A1 * | 4/2008 | Martinez et al. .............. 715/205 |

(Continued)

OTHER PUBLICATIONS

Gupta et al., "An Overview of Social Tagging and Application", Springer Scient+Business Media, LLC 2011, pp. 447-497 <http://www.springerlink.com/content/h507j5031nr34628/fulltext.pdf>.*

(Continued)

*Primary Examiner* — Thuy Dao
*Assistant Examiner* — Ben Wang
(74) *Attorney, Agent, or Firm* — Weaver Austin Villeneuve & Sampson LLP (57) ABSTRACT

Disclosed are apparatus and methods for performing actions with respect to objects. An object having an action tag, that specifies that a particular action script is to be performed with respect to the object, is provided. The action tag can be in the form of a textual label or any suitable user interface object that can be associated with the object. A search is then performed in a plurality of reference action tags, that each correspond to a different action script, for the provided action tag. When a matching reference action tag is found for the provided action tag, the corresponding, matching action script is then invoked so that the matching action script is automatically performed with respect to the object. Embodiments of the present invention also provide an action tag management architecture that is independent of the actions that are triggered by the action tags associated with particular objects and, accordingly, provides flexibility by allowing the set of actions to be expanded without requiring code changes to the tag management architecture.

31 Claims, 4 Drawing Sheets

U.S. PATENT DOCUMENTS

| | | | |
|---|---|---|---|
| 2008/0126961 A1* | 5/2008 | Naaman et al. | 715/764 |
| 2008/0222613 A1* | 9/2008 | Allen et al. | 717/128 |
| 2008/0278438 A1* | 11/2008 | Brown et al. | 345/156 |
| 2008/0282177 A1* | 11/2008 | Brown et al. | 715/763 |
| 2009/0138484 A1* | 5/2009 | Ramos et al. | 707/10 |
| 2010/0017378 A1* | 1/2010 | Gopalakrishnan | 707/4 |
| 2010/0095353 A1* | 4/2010 | Athsani et al. | 715/716 |

OTHER PUBLICATIONS

Gupta et al., "Survey on Social Tagging Techniques", ACM SIGKDD Explorations, vol. 12, Issue 1, Jun. 2010, pp. 58-72 <http://dl.acm.org/results.cfm?h=1&cfid=73454457&cftoken=56763537>.*

Steimle et al., "Cross-Media Linking and Tagging Support for Learning Groups", 2008 IEEE, pp. 714-719 <http://ieeexplore.ieee.org/stamp/stamp.jsp?tp=&arnumber=4741254>.*

Co-Annotea—A System for Tagging Relationships Between Multiple Mixed-Media Objects, 2008 IEEE, pp. 1-12 <http://ieeexplore.ieee.org/stamp/stamp.jsp?tp=&arnumber=4623943>.*

Yahoo Company, del.icio.us / help / tags, downloaded Jul. 17, 2006, http://del.icio.us/help.tags.

Yahoo Company, flickr, Yahoo Company, downloaded Jul. 17, 2006, http://flickr.com/help/tags#37.

Yahoo Company, del.icio.us / help / bundles, downloaded Jul. 17, 2006, http://del.icio.us/help/bundles.

Yahoo Company, del.icio.us / help / for, downloaded Jul. 17, 2006, http://del.icio.us/help/for.

Sarvis and Herrate et al., Metadata Creation System for Mobile Images, *MobiSys '04*, Jun. 6-9, 2004, Boston, MA, 2004; pp. 36-48.

Naaman et al., From Where to What: Metadata Sharing for Digital Photographs with Geographic Coordinates, Stanford University Visitor Center, 2005, pp. 1-21.

* cited by examiner

ACTION TAGS

BACKGROUND OF THE INVENTION

The present invention relates generally to manipulation of media objects or the like, such as photographs, video, audio files, and websites. More particularly, it relates to associating a tag with a media object, where the tag specifies an action to be taken with respect to such media object.

Currently, different applications exist for manipulating different types of objects. For example, a photo application typically is configured to allow one to edit a photograph, e.g., rotate, crop, etc. However, these type of operations are typically customized for the particular application and only include a static set of operations that can be performed on a photo object by a user of such application, which may be extended with software installations.

Other applications also provide passive tags that can be added to objects. For instance, the photo web application identified by the trademark Flickr™ provides a tagging function. In this photo organization experience, tagging is a passive experience for the user because tagging a photo does not actively trigger any action on the photo. After a number of photos have been tagged, a user can then search for photos having a particular tag by invoking a search function and specifying a keyword corresponding to a particular tag. The user can then organize these found photos. However, without the framework of an application site like a photo sharing website to process the photos, the tags themselves are less useful. Furthermore, for the user the benefits of tagging their content for future exploration and organization are not immediately obvious. That is, the user will typically have a delayed association between tagging and the usefulness of tagging.

Accordingly, improved mechanisms for tagging media objects and the like are needed. Additionally, it would be beneficial to provide an active tagging mechanism that automatically triggers a particular action to be performed on tagged media objects and the like.

SUMMARY OF THE INVENTION

Accordingly, apparatus and methods for associating action tags with objects are provided. In general, one or more action tag(s) may be associated with a particular object, such as a media object. An action tag management scheme is provided that uses each action tag of an object to thereby trigger performance of a particular set of operations with respect to such object. That is, a user can specify an action to be performed on an object simply by associating an action tag with such object. Embodiments of the present invention also provide an action tag management architecture that is independent of the actions that are triggered by the action tags associated with particular objects and, accordingly, provides flexibility by allowing the set of actions to be expanded without requiring code changes to the tag management architecture. For example, using the action tag management architecture, any third party application can perform an action on the user's content object. Additionally, code does not have to be altered or installed at the client in order to provide another type of action tag for use by such client.

In one embodiment, a computer implemented method for performing actions with respect to objects is disclosed. An object having an action tag, that specifies that a particular action script is to be performed with respect to the object, is provided. A search is then performed in a plurality of reference action tags, that each correspond to a different action script, for the provided action tag. When a matching reference action tag is found for the provided action tag, the corresponding, matching action script is then invoked so that the matching action script is automatically performed with respect to the object. In a specific implementation, the object is a media object selected from a group consisting of a photograph object, a video object, and an audio object.

In another aspect, a registration message that includes a new action tag that corresponds to a new action script is received. The new action tag is added to the plurality of searchable reference action tags. In a particular aspect, the plurality of reference action tags are stored in a data structure embodied in a computer readable medium so that each reference action tag is associated with a location of its corresponding action script. In a further aspect, the matching action script is invoked by passing a reference to the object or the object, along with any parameters associated with the object if present, to the location associated with the matching reference action tag.

In another embodiment, a result of the matching action script is automatically performed with respect to the object, depending on the context of the provided action tag and/or its associated provided object and/or a user who provided such object. In a further aspect, the context is selected from one or more of the following: a location of a user who provided the object, the identity of such user, the current time information, the user's social and/or physical relationship to other users, user history (e.g., past actions), a parameter associated with the provided action tag, one or more previous action(s) on the object, one or more other tag(s), and one or more other action(s) performed by one or more other user(s).

In an alternative embodiment, the invocation of the matching action script is automatically triggered by presence of the provided action tag associated with the object. In a further aspect, the invocation requires no additional action by a user, besides the user associating the action tag with the object and providing the object. In yet a further aspect, the object was provided by a user associating the action tag with the object and then uploading the object with its associated action tag to a server. In another application of the invention, the providing of the object was accomplished by user packaging the object with the action tag and one or more parameters if need for the action tag prior to uploading the object.

In another embodiment, a computer implemented method for facilitating performance of actions with respect to objects is disclosed. An object is provided, and a plurality of action tags are presented in a display. Each action tag specifies that a particular action script is to be performed with respect to the object. Input is received from a user to associate one or more of the presented action tag(s) with the provided object. The object and its associated action tag(s) are provided to an action tag management computer implemented process that is configured to invoke one or more action script(s) based on the associated action tag(s).

In a specific implementation, presenting the action tags is based on a context related to the user and/or object. In a further aspect, the context is selected from one or more of the following: a location of a user who provided the object, the identity of such user, the current time information, the user's social and/or physical relationship to other users, user history, a parameter associated with the provided action tag, one or more previous action(s) on the object, one or more other tag(s), one or more other action(s) performed by one or more other user(s). In yet a further aspect, a set of action tags are selected for presenting based on the context. In another aspect, the action tags are presented in the form of a prioritized list based on the context.

In another embodiment, the invention pertains to a device comprising a processor, memory, and a display. The processor and memory are configured to (i) provide an object, (ii) present a plurality of action tags in the display, wherein each action tag specifies that a particular action script is to be performed with respect to the object, (iii) receive input from a user to associate one or more of the presented action tag(s) with the provided object, and (iv) provide the object and its associated action tag(s) to an action tag management computer implemented process that is configured to invoke one or more action script(s) based on the associated action tag(s).

In one aspect, the device is in the form of a camera or camera-phone. In a further aspect, the object is provided from the camera or camera-phone to an action tag management server. In another embodiment, presenting the action tags is based on a context related to the user and/or object. In a further aspect, the context is selected from one or more of the following: a location of a user who provided the object, the identity of such user, the current time information, the user's social and/or physical relationship to other users, user history, a parameter associated with the provided action tag, one or more previous action(s) on the object, one or more other tag(s), one or more other action(s) performed by one or more other user(s).

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention allow a user to add one or more action tag(s) to an object, such as a media object. An action tag that is associated with a media object will trigger performance of an action with respect to the content that the user is tagging. This way, tagging becomes a gratifying experience for the user and increases the user interaction with the content that they are tagging. This feature adds utility and value to the user's experience.

Although the following description is directed specifically to using action tags for media type objects, such as photos, video, and audio files, it is noted that action tags can be utilized for other types of objects, such as executable files, text documents, web pages, etc. Additionally, several example action tags are described that result in actions that are suitably performed on a photograph type object. Of course, these examples are not meant to limit the scope of the invention to actions suitable for only photo type objects. That is, other types of action that can be applied to other types of objects are also contemplated.

Figure 1:
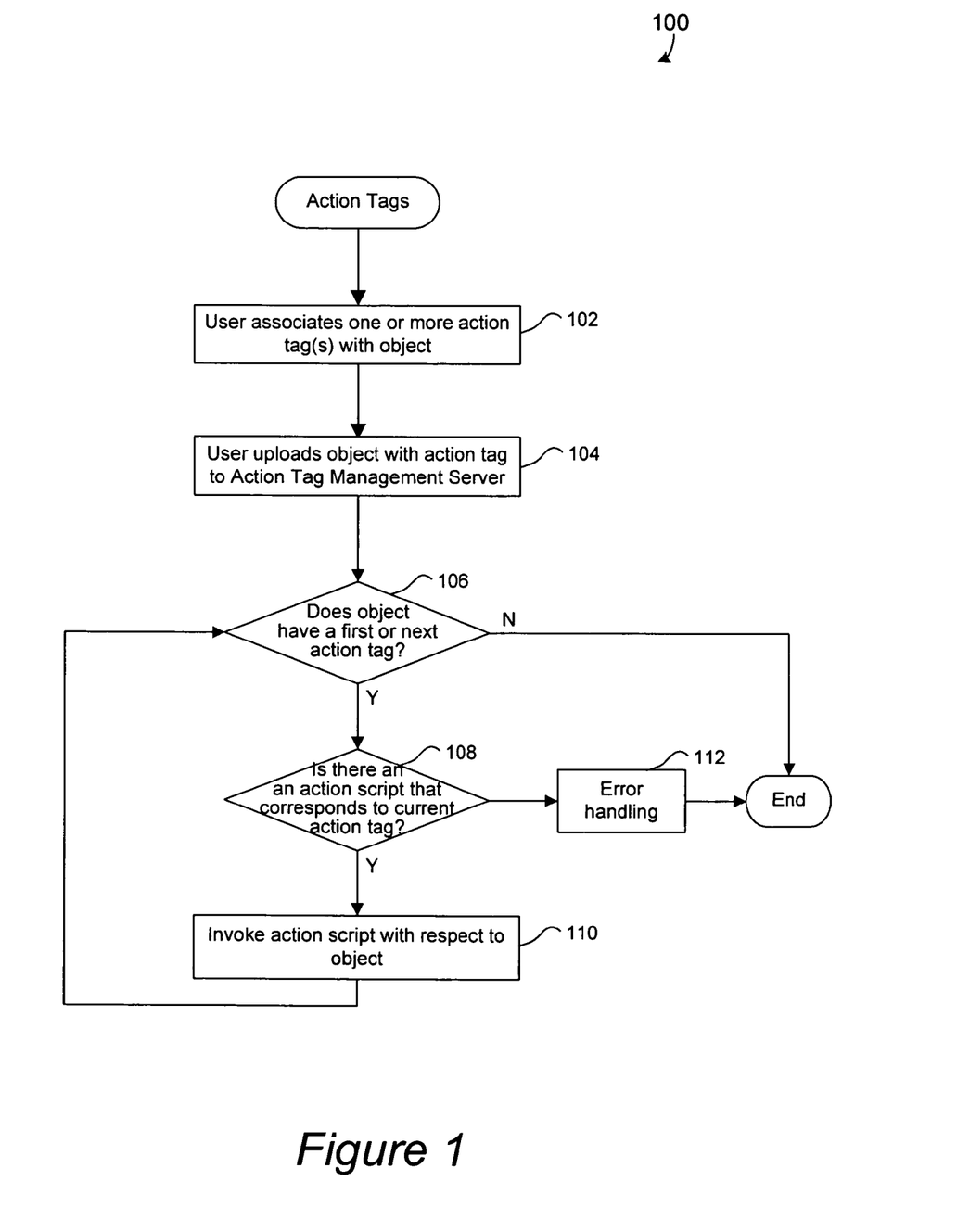
FIG. 1 is a flowchart illustrating a procedure for managing action tags in accordance with one embodiment of the present invention.

FIG. 1 is a flowchart illustrating a procedure for managing action tags in accordance with one embodiment of the present invention. Initially, a user associates one or more tag(s) with an object, such as a media object, in operation 102. The user may then upload the object with its one or more tags to an action tag management server in operation 104. In a specific application, a user may utilize her camera or camera-phone to take a photograph and then add an action tag to such photograph prior to uploading the tagged photo from her camera or camera-phone to an action tag management server.

Of course, uploading of a tagged object to a server is not necessary to practice techniques of the present invention. Action tags may be associated with objects that have already been uploaded to an action tag management server or that are already accessible by such server. In the latter example, the objects may have been previously stored at a particular location that is accessible by the action tag management server and, accordingly, such objects do not require uploading after tagging. In any of these examples, the process for associating action tags with objects may be performed at the same location (or with respect to the same server) as the action tag management processes or on any suitable device or computer system that is physically separate from the action tag management server.

In general, an action tag corresponds to a particular action script that is to be performed with respect to the object. The term "action script" refers to any set of executable operations that may be performed with respect to any type of object, such as a media object. The action tag may take any suitable form. By way of examples, the action tag can be in the form of a textual label or a user interface object that can be associated with an object. For instance, the user may drag an icon type action tag over an object to associate such action tag with the object. An action tag can alternatively be in the form of a audio object, such as a voice message.

In a specific implementation, each action tag is in a textual form and includes a marker by which a process can recognize the action tag type and may include one or more parameters that are used by the action script that corresponds to the action tag. The following list include example action tags, where some of the action tags are followed by a ":" and then one or more parameters separated by commas (with variable values being surrounded by "<>":

!rotate: left
!share: nearby
!share: email=<address>
!scan: WhiteBoard
!scan: BusinessCard
!scan: Document
!add2Album: album=<name>
!rate: restaurant=<name>, score=5, zip code=<zip code>

In the above list, a "!" is used to denote that the following field is an action tag, e.g., rotate, share, scan, add2Album, and rate. Of course, any suitable mechanism may be used to denote an action tag or the action tag can be automatically recognized. The remaining fields of a particular tag correspond to one or more parameters and corresponding values (if the parameter is a variable). By way of illustration, the action tag and parameter "!rotate:left" indicates that the object (e.g., photo) is to be rotated left.

The action tag "share" indicates that the corresponding photo object (or other type of object) is to be shared with one or more people. The corresponding action script may vary for the same action tag based on the particular parameter(s) utilized. For the share action tag, the action for an "email" parameter differs for a "nearby" parameter. If such share action tag includes a "email" parameter, then the object is shared via email to the indicated email address. If the share action tag has a "nearby" parameter, then the object is shared with other people that are in physical proximity the current user.

The action tag scan indicates that the corresponding photo object is to be converted into a document, such as a pdf (Portable Document Format) document, by a third party company that scans the photo and then generates the document, by way of example For instance, the "scan:WhiteBoard" action tag and parameter may result in the performance of various formatting operations on the photo object to align the text horizontally, enhance contrast, detect the edges of the whiteboard in the photo so as to then crop the photo to correspond to the whiteboard contents, etc. The "scan:BusinessCard" action tag and parameter may, in contrast, result in extraction of contact information from the photo to then be stored in a personal digital assistant (PDA) or contact application, e.g., a vCard format. The "scan:Document" action tag and parameter may together specify that the photo object is to be converted into a searchable (e.g., using OCR or optical character recognition fonts) pdf document. All three scan type action tags may result in the final product (e.g., pdf document or vCard) being emailed back to the user.

The action tag "add2Album" specifies that the corresponding photo object is to be saved into a specified album. The above action tag list is merely illustrative and is not meant to be restrictive. Other action tags and their use are described further below.

In another example, the action tag "rate" indicates that a rating is being applied with respect to the corresponding photo object. In this example, the "!rate" action tag is followed by a restaurant name and a score value (equal to 5). The action script associated with this tag may associate these parameter values (score and restaurant name) with the photo object and perhaps store this information together in a database associated with a special ratings web site. All of the collected rating information may be statistically analyzed to determine various rating characteristics for each rated entity, such as an average rating for each restaurant and the like.

Figure 2A:
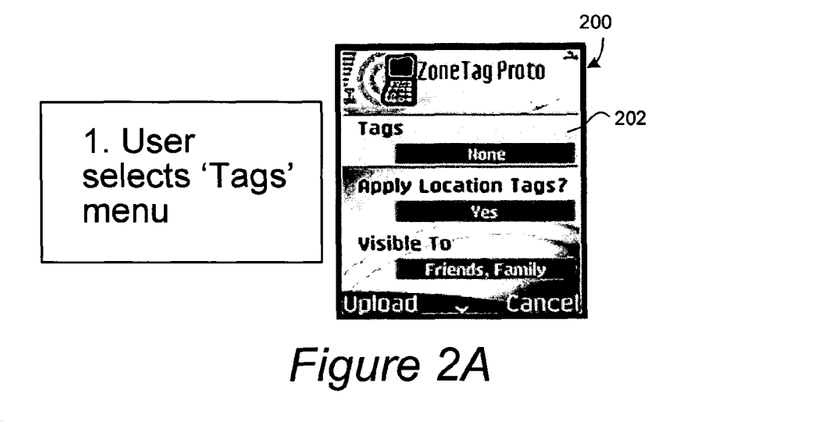
FIGS. 2A through 2C illustrate a plurality of screen shots from an action tag application for allowing a user to associate one or more action tags with a digital photo in accordance with a specific embodiment of the present invention.
Figure 2B:
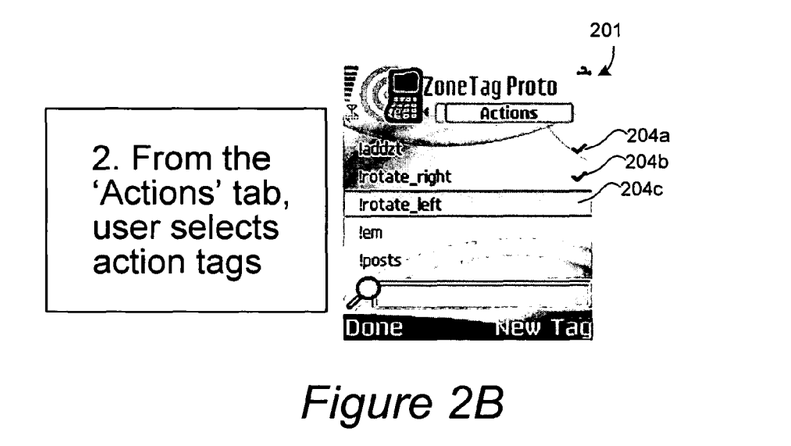
Figure 2C:
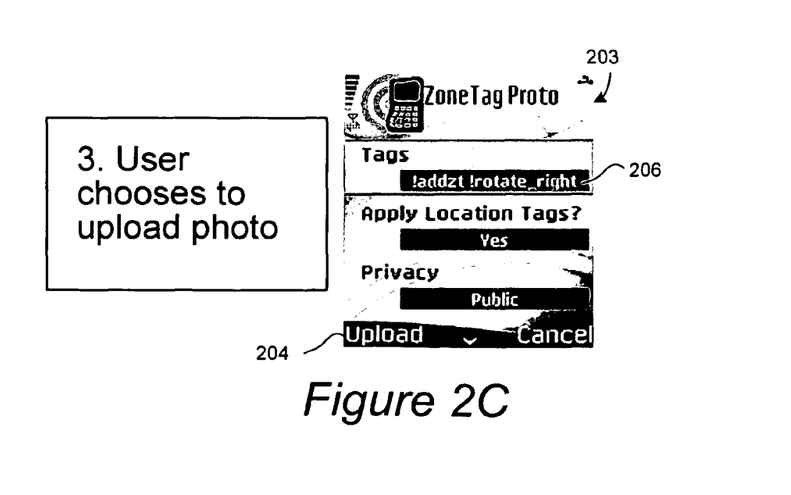

FIGS. 2A through 2C illustrate a plurality of screen shots from an action tag application for allowing a user to associate one or more action tags with a digital photo in accordance with a specific embodiment of the present invention. This action tag application is utilized with respect to a particular photo object, such as a digital photo obtained with a camera or camera-phone. The screen shot 200 of FIG. 2A shows a user selecting a tags menu entry 202 in a step 1. The screen shot 201 of FIG. 2B illustrates a user then selecting action tags (e.g., 204a~204c) from an "actions" tab in a step 2. As shown, action tags "!addzt" (204a) and "!rotate_right" (204b) have been selected. The screen shot 203 of FIG. 2C illustrates that the user has associated two action tags 206, "!addzt" and "!rotate_right", with a particular photo. The user may then choose to upload the photo and associated action tags to a particular action tag management server (e.g., via input button associated with upload 204) in step 3.

A user may be presented with a particular set of action tags based on a context of the user. Similarly, the user may be presented with a prioritized list of action tags with the most relevant action tags presented first in the list based on user or object context. Context may include any suitable characteristic related to the user, such as the identity of the user, a location of the user, current time information (e.g., time and/or date), the user's social and/or physical relationship to other users, user history (e.g., a user's previous actions), one or more previous action(s) on the object, one or more other tag(s), one or more other action(s) performed by one or more other user(s), etc. For example, when the user is located near a particular restaurant, the user may be presented with a "!rate" tag for specifying a rating of such restaurant.

The user may also be presented with one or more action tags based on their previous selection of an action tag. For example, if the user selects an action tag to create and generate an album for a first photo, the same action tag may be presented to the user for the next photo so that it can be tagged for adding to the same album. In another example, an action tag may specify a photo as being used in an inventory process (e.g., adding the photo of an item to an inventory database that compiles statistics on such items based on the photos or associating a barcode photo with an item photo), and then the user is presented with the same inventory action tag for the next photo.

Referring back to FIG. 1, after the object is associated with one or more action tags (and possibly uploaded), it may then be determined whether the object has a first action tag in operation 106. For example, the uploaded object may include appended action tags that are recognizable by the "!" character, or any other suitable identification mechanism, which is followed by the action tag and possibly one or more parameters. The object, action tags and their parameters may be either associated with each other using various referencing techniques or packaged together prior to uploading the object to a tag management server.

If the object has a first action tag, it may then be determined whether there is an action script that corresponds to the current action tag in operation 108. This operation may entail determining whether the action tag corresponds to an action script that is valid for such user or object. For instance, each user may have registered to use a certain set of action scripts and corresponding action tags. If there is not an action script that corresponds to the current action tag, various error handling procedures may be performed in operation 112 and the action tag management procedure 100 then ends. For instance, the user may be informed that he has used an invalid action tag and asked to either register a new action tag and corresponding action script with the tag management server (as explained further below) or use a valid action tag.

An action tag and its corresponding action script may be globally defined for all users. That is, once a particular action tag is defined as corresponding to a particular action script (or its location), this particular action tag may be utilized by various users to specify the same, corresponding action script is to be performed with respect to an object. Alternatively, the relationship between a particular action tag and its corresponding action script may be user defined or customized per user. That is, two different users may use a same action tag textual label to specify two different action scripts.

If there is an action script that corresponds to the first action tag, then the action script may be invoked in operation 110. It may thereafter be determined whether the object has a next action tag in operation 106. All of the action tags of the object are recognized and then the corresponding action scripts are invoked in operations 106 through 110. There also may be a mechanism for determining which order to call the action scripts specified by the action tags, e.g., action script order may be user defined as a parameter associated with the object or registered independently of a particular object with the action tag management server. After all the action tags of the object are handled, the tag management procedure 100 then ends.

Figure 3:
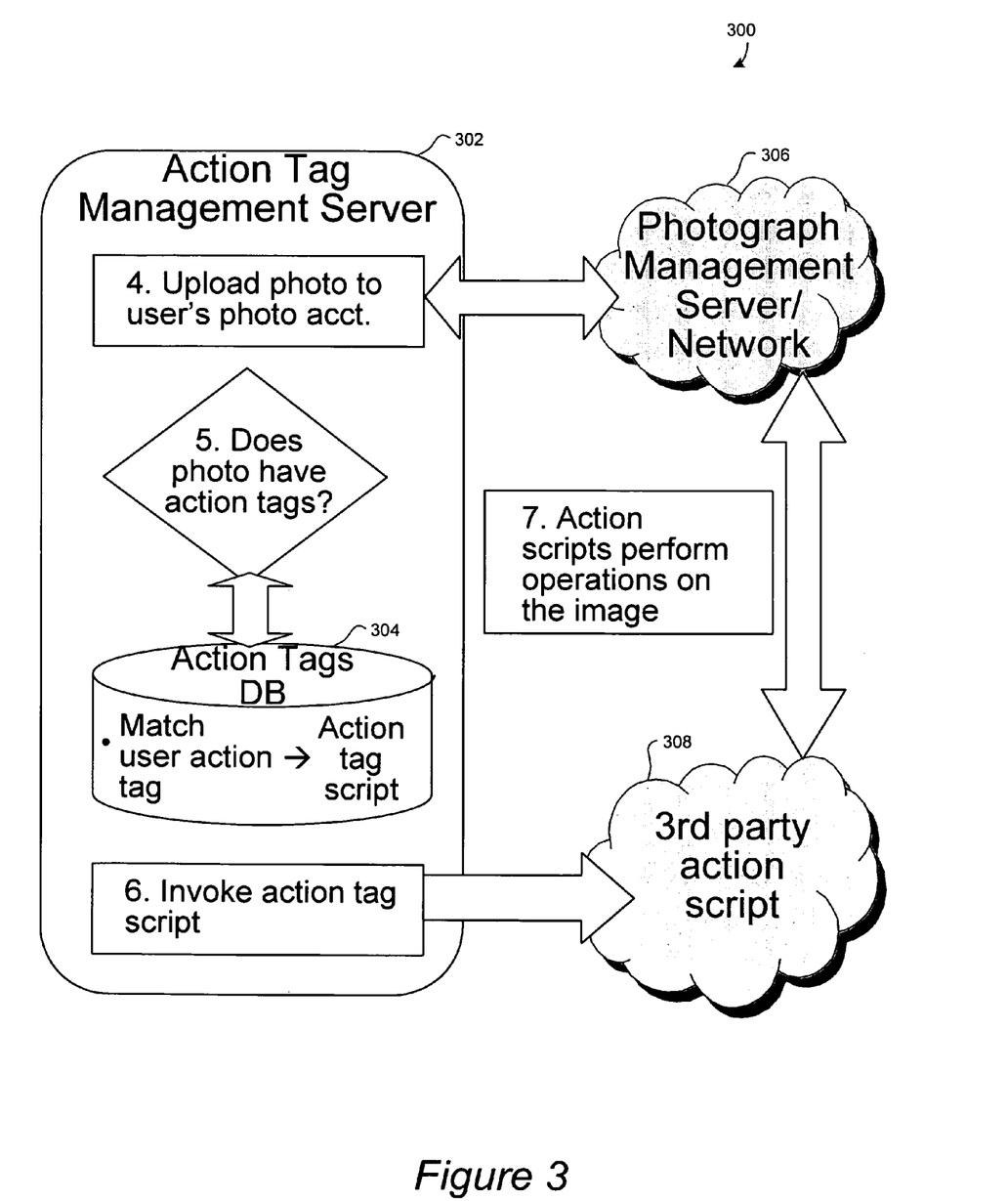
FIG. 3 is a diagrammatic representation of the operations performed by an action tag management server in accordance with one embodiment of the present invention.

FIG. 3 is a diagrammatic representation of the operations performed by an action tag management server 302 in accordance with one embodiment of the present invention. This example illustrates operations that may be implemented by an action tag management server after a user has uploaded a photo object by performing the illustrated steps 1 through 3 of FIGS. 2A~2C. Initially, the action tag management server may upload the received photo to the user's account that is located in a photograph management network or server, for example, in step 4. Of course, the photo may be archived or stored in any suitable location and may reside at the same location as the action tag management server, for example, or at a different location than the actual photo management services.

In step 5, it may then be determined whether the photo has action tags by accessing an Action Tag database 304, for example. This database contain data structures that associate a plurality of action tags with specific action scripts. This association may be implemented in any suitable format. In one implementation, each action tag is associated with a location of a corresponding action script. That is, the database contains a plurality of reference action tags that each correspond to an action script location. Thus, the reference tags may be searched for a match to an action tag of a particular photo.

When a matching reference tag and its corresponding action script (or location) is found, this matching action script may then be invoked by the action tag management server in step 6. For example, a third party action script 308 may be invoked by sending the photo or a reference to the photo object and the associated action tag and parameters to the third party action script 308. Of course, the invoked action script does not have to be developed and maintained by a third party, but can be developed and maintained as part of the action tag management server processes and, thus, may be located at a same server as the action tag management processes. An object may be associated with a plurality of action tags. Each action tag may be handled by a different or same action tag script located at a same or different location.

The performance of the action script may be based on context. For instance, the action script results may also be based on context. That is, users having different contexts would get different results when using a same action tag. For example, a "!share:nearby" tag that specifies to share with nearby users depends on which users are located near the tagging user. Location of the tagging user and nearby users can be obtained in any suitable manner. For example, users who share a same or adjacent cellular phone cell may be defined as nearby users. The tag management server can obtain knowledge of nearby users by the nearby users interacting with the tag management server with their communication devices (e.g., cell phones). In a similar example, an action tag may specify to share the photo with people shown in the photo. The corresponding action script would then include face recognition processes for identifying the people in the photo, obtaining emails or addresses of the recognized people (e.g., from any suitable database), and then sending a copy of the photo to the email or address of such people.

In another example, photos that are tagged with an action tag that specifies sharing of photos with particular ratings would result in the tagged photo being shared if the photo was rated (e.g., in the same tag or a different tag) above a particular score. Likewise, an action tag that specifies only a highly rated photo is to be stored in an album results in the tagged photo being stored in such album when its rating is above a predetermined level. In another rating example, when a "!rate" tag is added to a photo, it may be assumed that a particular restaurant that is near the user is being rated and the rating score may be collected for the photo and applied to the particular nearby restaurant. In a different type of example, a photo may contain a "!status" tag that specifies that this photo is to be used to show others the user's current status. For instance, the user may take photos of various items (e.g., restaurant, bowling alley, work space, etc.) through out his day to show what he is doing (e.g., eating, bowling, working, etc.). This status photo may be accessible by any authorized people (e.g., available via web calendar, email, text message, instant message, etc.).

An object may be tagged with an action tag that specifies that information is to be obtained from a specific website and then automatically associated with the tagged object or a set of tagged objects. In one example for obtaining information, the information is obtained from a suitable source, such as a information provider, based on the contextual information such as location and/or time associated with the media object. That is, the context is automatically determined and used to gather information related to a particular object or context. In these examples, the action is not necessarily performed on the object, but with respect to the object. For example, the object and its action tag are used to trigger an action being performed for the particular user.

Another similar type of action tag may be used to associate the currently tagged photo object with a previously obtained/uploaded photo object, and this action would get different results for different users who have different tagged photos and previous photos. In an extension of the "associating" action, the photos may be associated differently based on the type of photo as specified by a "type" parameter or tag, for example. For instance, a business card photo would be associated with the previous photo in a different manner, as compared with a barcode photo. In another example, if you wished to annotate a photo with the current weather, an action tag "!weather" is added to the photo and then the corresponding action script operates to obtain a current weather forecast (e.g., cloudy) and annotate it to the photo.

A particular action tag may specify that the tagged media object is to be sent to a particular person under certain conditions. For example, an action tag may indicate that all such tagged photos that are labeled as pictures of a daughter that are taken on a holiday or weekend are to be sent to the wife of the user.

An action tag may be a photograph of digitally encoded information, such as a barcode or two dimensional encoded object. In some implementations, an action script can be based on at least part of the encoded information. For example, an action script may utilize encoded information, such as product information, to take inventory. In a barcode or two dimensional encoded object example, the action script itself can be contained within the bar code so that a photo of the encoded information does not have to be tagged by the user. When a photo of such encoded information is obtained, the action specified by the encoded information is automatically performed.

A particular action script may be made available on the action tag management server or on a different server. For example, a particular action script may be developed by a third party who is unrelated to the developers of the action tag management application or by a same party. The object or a reference to the object may be sent to the action script. When an object reference is sent, access to the object may be protected by authentication mechanisms. For example, an action script may have to be authorized to access particular objects or registered to access any objects provided by particular users. In one implementation, each object can be identified as private, accessible by anyone, or accessible by a subset of individuals or entities.

Embodiments of the present invention also provide an action tag management architecture that is independent of a specific website or application for post-processing of the tags and content, and provides flexibility by allowing the set of actions to be expanded without requiring code changes to the tag management architecture. For example, using the action tag management architecture, any third party application can perform an action immediately on the user's content object. Additionally, code does not have to be altered at the client in order to provide another type of action tag for use by such client.

Any suitable mechanism may be utilized to add an action tag to the set of searchable reference action tags. In general, a new action tag name and the location of the corresponding action script are provided to the action tag management server. For example, a user may specify that when the action tag "!Rate" is used for a particular object, the object and its parameters are passed to a particular action script, which then uses the parameters to assess a rating score for the particular object (e.g., rating score for a particular restaurant). Particular parameters that are used with the new action tag may also be provided although this is not necessary since an object, its action tag(s) and all parameters may simply be passed to the corresponding action script.

Figure 4:
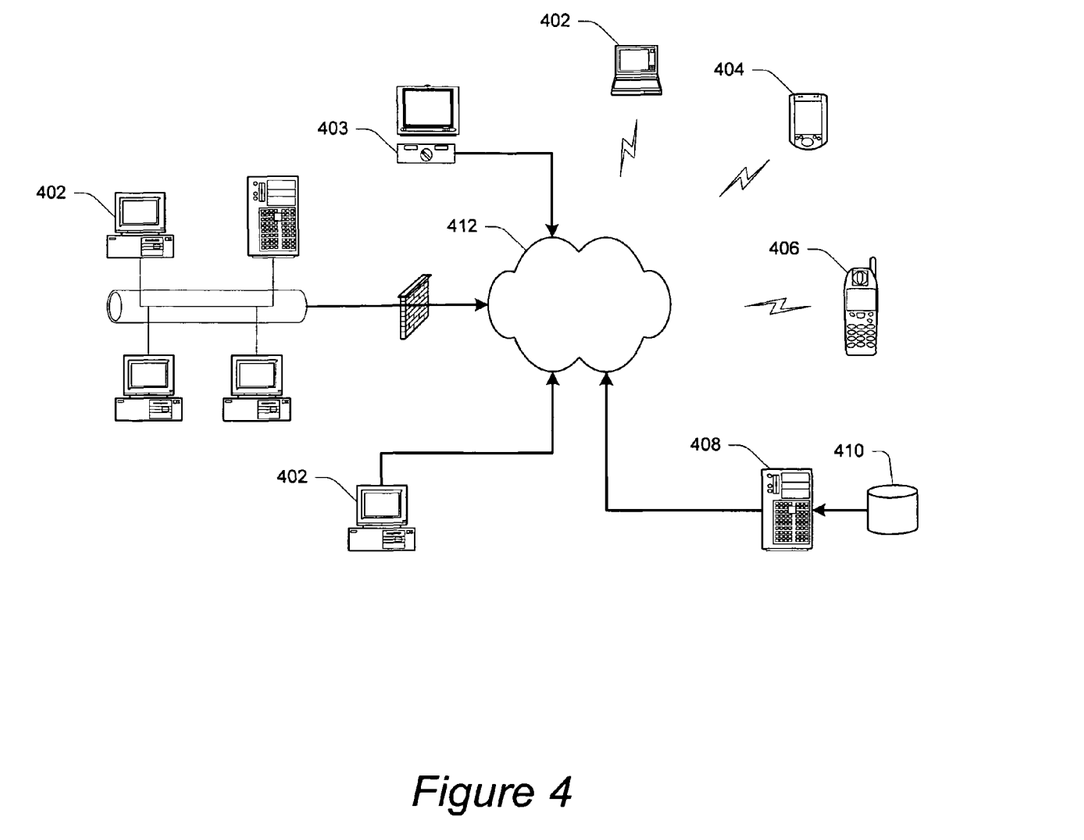
FIG. 4 is a simplified diagram of a network environment in which specific embodiments of the present invention may be implemented.

In one implementation, an action script may be defined and published as a web service so that a user can then discover such web service. The user can then specify the web service and associate an action tag with such web service. For example, the user can inform the action tag management server that he/she wishes to use a particular action tag for a particular action script that resides at a specified location. The tag management server then stores the new action tag and associated action script location for later use by the informing user or use by any other user. When this new action tag is used on an object, the object and its associated action tag and parameters are then passed to the corresponding action script location. Alternatively, the user can access a particular link or URL of a third party action script provider, which causes the user to be registered to use a particular action tag. In other words, the script provider may register the particular action and corresponding action tag for the user (and possibly registering the action tag for use by other users) with the tag management server. An action script developer can also register action tags and corresponding action scripts with the action tag management server Embodiments of the present invention may be employed to utilize action tagging in any of a wide variety of computing contexts. For example, as illustrated in FIG. 4, implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

And according to various embodiments, objects and their associated action tags that are processed in accordance with the invention may be obtained using a wide variety of techniques. For example, action tag associations representing a user's interaction with a local application, web site or web-based application or service (e.g., associations between objects and their action tags and their parameters) may be accomplished using any of a variety of well known mechanisms for recording a user's behavior. However, it should be understood that such methods of tagging are merely exemplary and that tagging information may be collected in many other ways. For example, tagging information for various objects may be collected when a user uploads objects or registers with, for example, a particular web site or service.

Once one or more action tags (and any relevant parameters) are associated with one or more objects, action tag management may be handled according to the invention in some centralized manner. This is represented in FIG. 4 by server 408 and data store 410 which, as will be understood, may correspond to multiple distributed devices and data stores. The invention may also be practiced in a wide variety of network environments (represented by network 412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Although the foregoing invention has been described in some detail for purposes of clarity of understanding, it will be apparent that certain changes and modifications may be practiced within the scope of the appended claims. Although the above examples describe a user associating action tags with his/her own content, of course, a user may also associate an action tag with another user's content or with content that was automatically generated without a user. Therefore, the present embodiments are to be considered as illustrative and not restrictive and the invention is not to be limited to the details given herein, but may be modified within the scope and equivalents of the appended claims.

What is claimed is:

1. A computer implemented method for performing actions with respect to media objects, comprising:

obtaining a media object having an action tag at indicates that a corresponding action script is to be performed with respect to the object;

automatically searching for the action tag in a plurality of reference action tags, each of the plurality of reference action tags corresponding to one or more of a plurality of action scripts, wherein each of the plurality of reference action tags is defined independently from objects that are tagged with one or more of the plurality of reference action tags;

when one of the plurality of reference action tags that matches the action tag is found, automatically invoking a corresponding one of the plurality of action scripts so that the matching action script is automatically performed with respect to the media object, and wherein invoking the matching action script produces a result based, at least in part, on a context that is independent from, with respect to, or associated with the media object, wherein the media object is selected from a photograph object, a video object, or an audio object.

2. The method as recited in claim 1, further comprising:
receiving a registration message that includes a new action tag that corresponds to a new action script; and
adding the new action tag to the plurality of searchable reference action tags.

3. The method as recited in claim 1, wherein the plurality of reference action tags are stored in a data structure embodied in a computer readable medium so that each reference action tag is associated with a location of its corresponding action script.

4. The method as recited in claim 3, wherein the matching action script is invoked by passing a reference to the media object or the media object, along with any parameters associated with the media object if present, to the location associated with the matching reference action tag.

5. The method as recited in claim 1, wherein the context is selected from a group consisting of a location of a user who provided the media object or who provided the action tag associated with the media object, the identity of such user, current time information, the user's social and/or physical relationship to other users, user history, a parameter associated with the provided action tag, one or more previous action(s) on the media object, one or more other tag(s), and one or more other action(s) performed by one or more other user(s).

6. The method as recited in claim 1, wherein the invocation of the matching action script is automatically triggered by presence of the action tag associated with the media object.

7. The method as recited in claim 6, wherein the invocation requires no additional action by a user, besides the user associating the action tag with the media object.

8. The method as recited in claim 1, wherein the media object was provided by a user associating the action tag with the media object and then uploading the media object with its associated action tag to a server.

9. The method as recited in claim 1, wherein the action tag associated with the media object is a photograph of digitally encoded information.

10. The method as recited in claim 9, wherein the matching action script is affected at least in part by the encoded information.

11. The method as recited in claim 2, wherein automatically invoking the corresponding one of the plurality of action scripts comprises manipulating the media object.

12. The method as recited in claim 1, further comprising: providing the media object having the action tag.

13. The method as recited in claim 1, wherein the obtaining, searching, and invoking are performed via a web application.

14. The method as recited in claim 1, wherein the plurality of reference action tags are not associated with media objects.

15. The method as recited in claim 1, wherein the matching action script is identified based, at least in part, on an identity of a user, thereby enabling the action tag to have more than one corresponding action script.

16. The method as recited in claim 15, wherein the user selected, defined, or customized the matching action script.

17. The method as recited in claim 15, wherein the identity of the user is associated with a user account.

18. The method as recited in claim 1, wherein the action tag is one of the following types of action tags: rotate, share, scan, add to album, and rate.

19. A computer implemented method for facilitating performance of actions with respect to media objects, comprising:
providing media object;
presenting a plurality of action tags, wherein each of the plurality of action tags indicates that a corresponding one of a plurality of action scripts is to be performed in association with media objects that are tagged with the corresponding one of the plurality of action tags;
receiving input from a user to associate one or more of the presented plurality of action tags with the provided media object; and
providing the media object and its associated action tags to an action tag management computer implemented process that is configured to invoke one or more of the plurality of action scripts with respect to the media object based on the associated action tags;
wherein invoking the one or more of the plurality of action scripts with respect to the media object based on the associated action tags produces a result based, at least in part, on a context that is independent from, respect to, or associated with the media object, wherein the media object is selected from a photograph object, a video object, or an audio object.

20. The method as recited in claim 19, wherein the plurality of action tags that are presented are based on a context related to the user and/or media object.

21. The method as recited in claim 19, wherein the context is selected from a group consisting of a location of the user, the identity of the user, current time information, the user's social and/or physical relationship to other users, user history, a parameter associated with the provided action tag, one or more previous action(s) on the media object, one or more other tag(s), and one or more other action(s) performed by one or more other user(s).

22. The method as recited in claim 21, wherein a set of action tags are selected for presenting based on the context.

23. The method as recited in claim 21, wherein the action tags are presented in the form of a prioritized list based on the context.

24. The method as recited in claim 19, wherein the plurality of action tags are selectable by the user.

25. The method as recited in claim 19, wherein presenting is performed via a graphical user interface.

26. A device comprising a processor, memory, and a display, the processor and memory being configured to:
providing an object;
presenting a plurality of action tags in the display, wherein each action tag indicates that a corresponding one of a plurality of action scripts is to be performed in association with objects that are tagged with the corresponding one of the plurality of action tags;
receiving input from a user to associate one or more of the presented plurality of action tags with the provided object; and
providing the object and its associated action tags to an action tag management computer implemented process that is configured to invoke one or more of the plurality of action scripts with respect to the object based on the associated action tags;
wherein invoking the one or more of the plurality of action scripts with respect to the object based on the associated action tags produces a result based, at least in part, on a context that is independent from, with respect to, or associated with the object wherein the object is a media object, wherein the media object is selected from a photograph object, a video object, or an audio object.

27. The device as recited in claim 26, wherein the device is in the form of a camera or camera-phone.

28. The device as recited in claim 27, wherein the object is provided from the camera or camera-phone to an action tag management server.

29. The device as recited in claim 26, wherein the plurality of action tags that are presented are based on a context related to the user and/or object.

30. The device as recited in claim 26, wherein the context is selected from a group consisting of a location of a user who provided the object, the identity of such user, current time information, the user's social and/or physical relationship to other users, user history, a parameter associated with the provided action tag, one or more previous action(s) on the object, one or more other tag(s), and one or more other action(s) performed by one or more other user(s).

31. A device comprising a processor, memory, and a display, the processor and memory being configured to:

obtaining a media object having an action tag that indicates that a corresponding action script is to be performed with respect to the object;

automatically searching for the action tag in a plurality of reference action tags, each of the plurality of reference action tags corresponding to one or more of a plurality of action scripts, wherein each of the plurality of reference action tags is defined independently from objects that are tagged with one or more of the plurality of reference action tags;

when one of the plurality of reference action tags that matches the action tag is found, automatically invoking a corresponding one of the plurality of action scripts so that the matching action script is automatically performed with respect to the media object, and wherein invoking the matching action script produces a result based, at least in part, on a context that is independent from, with respect to, or associated with the media object, wherein the media object is selected from a photograph object, a video object, or an audio object.

* * * * *